(12) United States Patent  
Iwadate (10) Patent No.: US 12,050,820 B2  
(45) Date of Patent: Jul. 30, 2024

(54) IMAGE PROCESSING APPARATUS WITH RECOVERY PROTOCOL FOR ERRORS ON OUTPUT PROCESSING OF A DOCUMENT IMAGE, CONTROL METHOD, AND STORAGE MEDIUM STORING PROGRAM

(71) Applicant: CANON KABUSHIKI KAISHA, Tokyo (JP)

(72) Inventor: Yasuhiro Iwadate, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/181,425

(22) Filed: Mar. 9, 2023

(65) Prior Publication Data

US 2023/0305765 A1  Sep. 28, 2023

(30) Foreign Application Priority Data

Mar. 25, 2022 (JP) ................. 2022-050454

(51) Int. Cl.
*G06F 3/12* (2006.01)

(52) U.S. Cl.
CPC ................... *G06F 3/121* (2013.01)

(58) Field of Classification Search
CPC ........... H04N 1/00225; H04N 1/00233; H04N 1/0048; H04N 1/00925; H04N 1/00928; H04N 1/00933; H04N 1/00217; H04N 1/00214; H04N 1/00206; H04N 1/00087; H04N 1/00076; H04N 1/00063; H04N 1/00015; H04N 1/00013; H04N 1/00002; H04N 1/00236; H04N 1/00209
See application file for complete search history.

(56) References Cited

U.S. PATENT DOCUMENTS

| 11,403,050 B2* | 8/2022 | Kaneda | G06F 3/121 |
| 11,593,042 B2* | 2/2023 | Takayama | G06F 3/121 |
| 11,645,023 B2* | 5/2023 | Ogawa | G06F 3/1229 358/1.15 |
| 2001/0051963 A1* | 12/2001 | Nishikawa | G06F 3/121 715/255 |
| 2006/0224559 A1 | 10/2006 | Abiko | 707/1 |
| 2007/0109586 A1* | 5/2007 | Yamada | G06F 3/1235 358/1.14 |
| 2010/0296113 A1* | 11/2010 | Fujii | G06F 3/1234 358/1.9 |
| 2013/0329250 A1* | 12/2013 | Takamiya | H04N 1/32096 358/1.15 |
| 2014/0331164 A1* | 11/2014 | Enomoto | H04N 1/00307 715/771 |

(Continued)

FOREIGN PATENT DOCUMENTS

JP   2006-272904   10/2006

*Primary Examiner* — Henok Shiferaw
(74) *Attorney, Agent, or Firm* — Venable LLP (57) ABSTRACT

An image processing apparatus comprising: a first performing unit configured to perform a first output process using read data read by a reading unit configured to optically read a document image; a display unit configured to display a selection screen on which a second output process different from the first output process is selectable when an error occurs during performing the first output process; and a second performing unit configured to perform the second output process using the read data used in the first output process when the second output process is selected.

11 Claims, 5 Drawing Sheets

(56) References Cited

U.S. PATENT DOCUMENTS

| | | | |
|---|---|---|---|
| 2018/0063366 A1* | 3/2018 | Mori | H04N 1/00424 |
| 2019/0281174 A1* | 9/2019 | Koyanagi | H04N 1/00241 |
| 2020/0076975 A1* | 3/2020 | Nishiyama | H04N 1/00779 |
| 2020/0097236 A1* | 3/2020 | Miyadome | G06F 3/1207 |
| 2020/0213458 A1* | 7/2020 | Hara | H04N 1/0044 |
| 2020/0374411 A1* | 11/2020 | Takase | H04N 1/00482 |
| 2021/0344809 A1* | 11/2021 | Nishiyama | H04N 1/00708 |
| 2022/0405025 A1* | 12/2022 | Minamihara | G06F 3/1275 |
| 2023/0054855 A1* | 2/2023 | Fukuchi | G06F 3/1256 |

\* cited by examiner

IMAGE PROCESSING APPARATUS WITH RECOVERY PROTOCOL FOR ERRORS ON OUTPUT PROCESSING OF A DOCUMENT IMAGE, CONTROL METHOD, AND STORAGE MEDIUM STORING PROGRAM

BACKGROUND OF THE INVENTION

Field of the Invention

The present invention relates to an image processing apparatus that allows reading a document image, a control method, and a storage medium storing a program.

Description of the Related Art

In recent years, large-format inkjet printing apparatuses have been increasingly used as copying machines, and are required to deal with large-sized documents and long documents. In order to deal with large-sized documents, documents are generally set not by a flatbed scanner system but an automatic document feeder (ADF) scanner system involving document conveyance. When a copy process is performed by the large-format inkjet printing apparatus, after a reading process of a document is performed, a printing process is performed based on image data obtained by the reading process. At this time, when the document is damaged (jammed) during the printing while the reading is successful, it is necessary to perform the process from scanning again.

Japanese Patent Laid-Open No. 2006-272904 discloses a configuration in which when a jam occurs in a printing process, images of a plurality of pages including a page on which the jam has occurred are displayed after the jam is cleared, and a printing apparatus that controls such that the printing process is resumed from a selected page.

SUMMARY OF THE INVENTION

The present invention provides an image processing apparatus that improves convenience when an error occurs during performing an output process, a control method, and a storage medium storing a program.

The present invention in one aspect provides an image processing apparatus comprising: a first performing unit configured to perform a first output process using read data read by a reading unit configured to optically read a document image; a display unit configured to display a selection screen on which a second output process different from the first output process is selectable when an error occurs during performing the first output process; and a second performing unit configured to perform the second output process using the read data used in the first output process when the second output process is selected.

The present invention allows improving convenience when an error occurs during performing the output process.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Japanese Patent Laid-Open No. 2006-272904 describes a method of resuming printing when a jam error occurs during printing, but does not refer to enabling switching to an output process other than printing at the time of resumption.

According to the present disclosure, it is possible to improve convenience when an error occurs during performing an output process.

Figure 1:
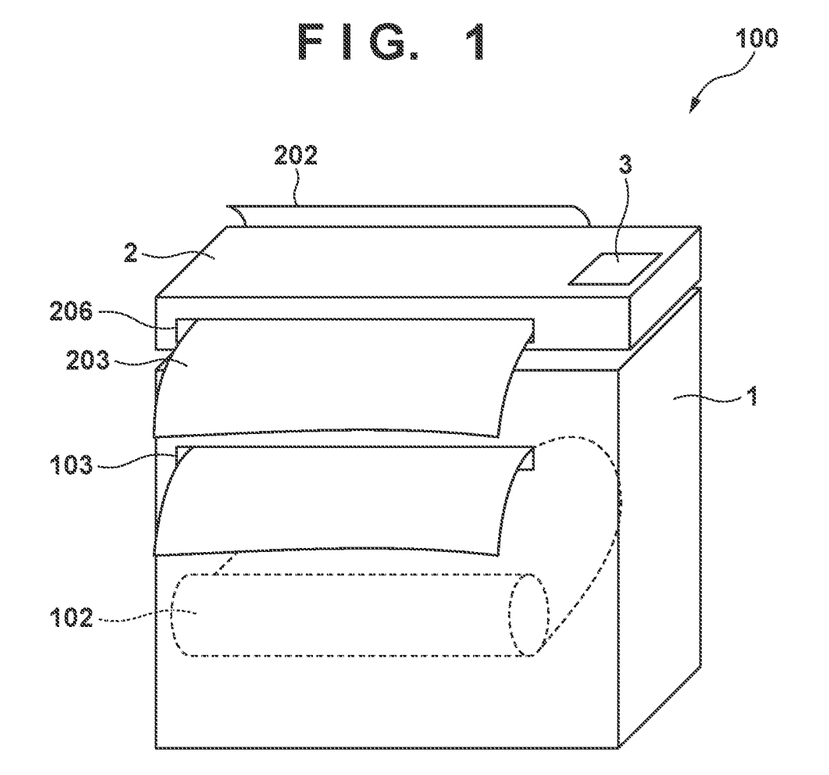
FIG. 1 is a schematic view of a copying machine.

FIG. 1 is a schematic diagram of a large-format inkjet copying machine 100 (hereinafter simply referred to as a copying machine) of the present embodiment. The large-format inkjet copying machine 100 is an image processing apparatus that can perform recording on a long printing medium (large-format printing medium), such as roll paper, by an inkjet recording method and read (scan) a large-sized document image, such as a long document. The image processing apparatus in the present embodiment is not limited to the apparatus that performs printing on a large-sized printing medium as described above, and may be an apparatus that performs printing on a small-sized printing medium, such as cut paper. Although the copying machine 100 is described as a printing apparatus using an inkjet recording method, it may be a printing apparatus using another recording method, such as an electrophotographic method. The image processing apparatus in the present embodiment only needs to can perform a scan process and an output process of image data obtained by the scanning. The output process of the image data obtained by the scanning is, for instance, a copy process of printing the image data or a transmission process of transmitting the image data to an external device. The examples include a memory storage process that stores the image data in an externally-attached memory (such as a USB memory) and a folder storage process that stores the image data in a folder on a network to which the image processing apparatus is connected or in the image processing apparatus. The example includes a mail process that transmits the image data to a designated mail address. In the present embodiment, the image processing apparatus can perform all of the processes. However, the image processing apparatus may have a configuration of allowing performing only some processes among the processes.

A printing device mechanism 1 internally includes a paper feed mechanism of a roll paper 102, and performs recording on the roll paper 102 based on print data received from the outside or read data received from a reading device mechanism 2. The read data received from the reading device mechanism 2 is image data obtained by reading by the reading device mechanism 2. In addition, the printing device mechanism 1 outputs a printed material on which recording has been performed from a paper output port 103. The reading device mechanism 2 optically reads a surface of a document 203 set in an insertion port 206. Front-and-back inversion is performed on the document 203 that has been read via a U-turn mechanism 202 from the back surface of the apparatus, and the document 203 is conveyed to the front side of the insertion port 206 via the upper portion of the reading device mechanism 2 and discharged while being held in a hanging state. A user can remove the document 203 by pulling it out by hand. A panel 3 is an operation unit, and, for instance, displays a user interface screen that can accept each setting of the printing process by the printing device mechanism 1 and the reading process by the reading device mechanism 2. For instance, regarding the reading process of the document 203, it is possible to accept, for instance, a width and a length of the document 203 set in the reading device mechanism 2, setting of the type of the printing medium, such as a paper type, setting of a resolution, and setting of an output destination, and it is possible to accept performing start of the reading process and the printing process.

Figure 2:
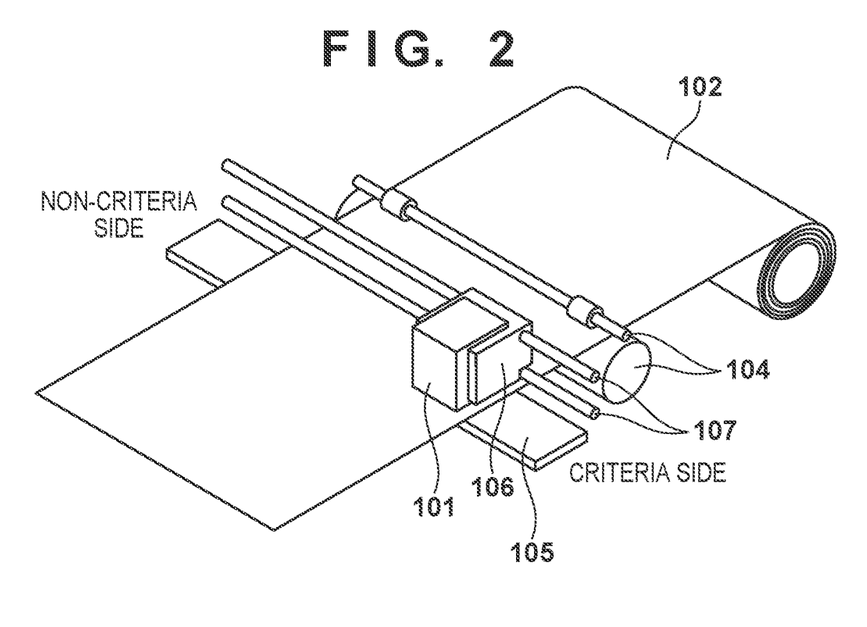
FIG. 2 is a schematic view illustrating a configuration of a printing device mechanism.

FIG. 2 is a schematic perspective view of the printing device mechanism 1 in the copying machine 100. A printing head 101 is mounted on a carriage 106, and the carriage 106 can reciprocally move along guide shafts 107. A direction in which the carriage 106 moves is referred to as a main scanning direction. The moving speed of the carriage 106 can be arbitrarily changed. During printing, the roll paper 102 is conveyed to a platen 105 side by paper feed rollers 104. The platen 105 supports the roll paper 102 using a platen fan (not illustrated), and the roll paper 102 is intermittently conveyed by the paper feed rollers 104. The conveyance speed by the paper feed rollers 104 can be arbitrarily changed. The direction in which the roll paper 102 is conveyed is referred to as a sub-scanning direction, the side of the paper feed rollers 104 is referred to as an upstream side, and the side of the platen 105 is referred to as a downstream side. The printing device mechanism 1 is configured as a serial type inkjet printing apparatus. An image is formed on the roll paper 102 by repeating an ejection operation of ink droplets from the printing head 101 along with the conveyance of the roll paper 102 in the sub-scanning direction and reciprocal movement of the carriage 106 in the main scanning direction. It is possible to provide a wait time at the time of inversion when the carriage 106 reciprocally moves in the main scanning direction. The number of nozzles from which ink droplets are ejected in the printing head 101 can be arbitrarily changed. Therefore, it is possible to change the discharge range corresponding to one movement of the carriage 106.

Figure 3A:
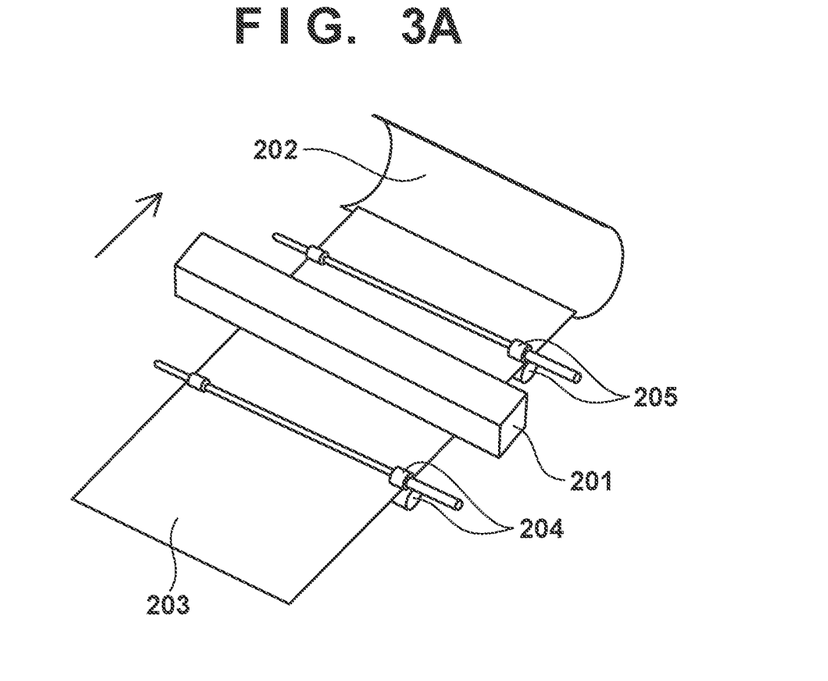
FIGS. 3A and 3B are schematic views illustrating a configuration of a reading device mechanism.
Figure 3B:
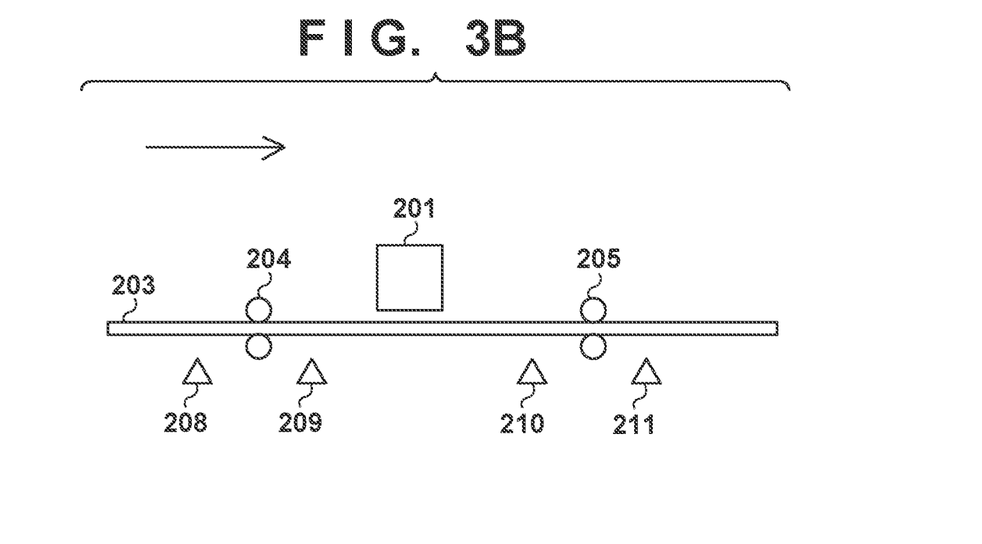

FIG. 3A is a schematic perspective view of the reading device mechanism 2 of the copying machine 100, and FIG. 3B is a side view of the configuration of FIG. 3A. The reading device mechanism 2 detects the document 203 by a media sensor 208. The document 203 is conveyed to a position of a media sensor 209 by conveyance rollers 204 in the arrow direction in FIGS. 3A and 3B. A state in which the document 203 is stopped at the position of the media sensor 209 is referred to as a document set state. When a reading start instruction is given by the user in the document set state, image reading of the document 203 is started. The document 203 is conveyed in the direction of the U-turn mechanism 202 by the conveyance rollers 204 and conveyance rollers 205. The conveyance direction at this time is also referred to as a feeding direction. Then, the surface of the document 203 is read when it passes through a reading sensor 201. The documents 203 are discharged to the outside of the apparatus in order as they are read. During this time, a document length is measured from the amount of conveyance conveyed from the detection of the distal end of the document 203 until the detection of the rear end of the document 203 by the media sensor 209. Front-and-back inversion is performed on the document 203 via the U-turn mechanism 202 and the document 203 is discharged. Here, when a media sensor 210 detects that the rear end of the document 203 has come off, the reading device mechanism 2 immediately stops the conveyance rollers 205 and stops the conveyance of the document 203 with the document 203 being sandwiched between the conveyance rollers 205 to prevent the document from falling. The user can take out the document 203 by pulling out a portion that hangs down with the document 203 sandwiched between the conveyance rollers 205.

Figure 4:
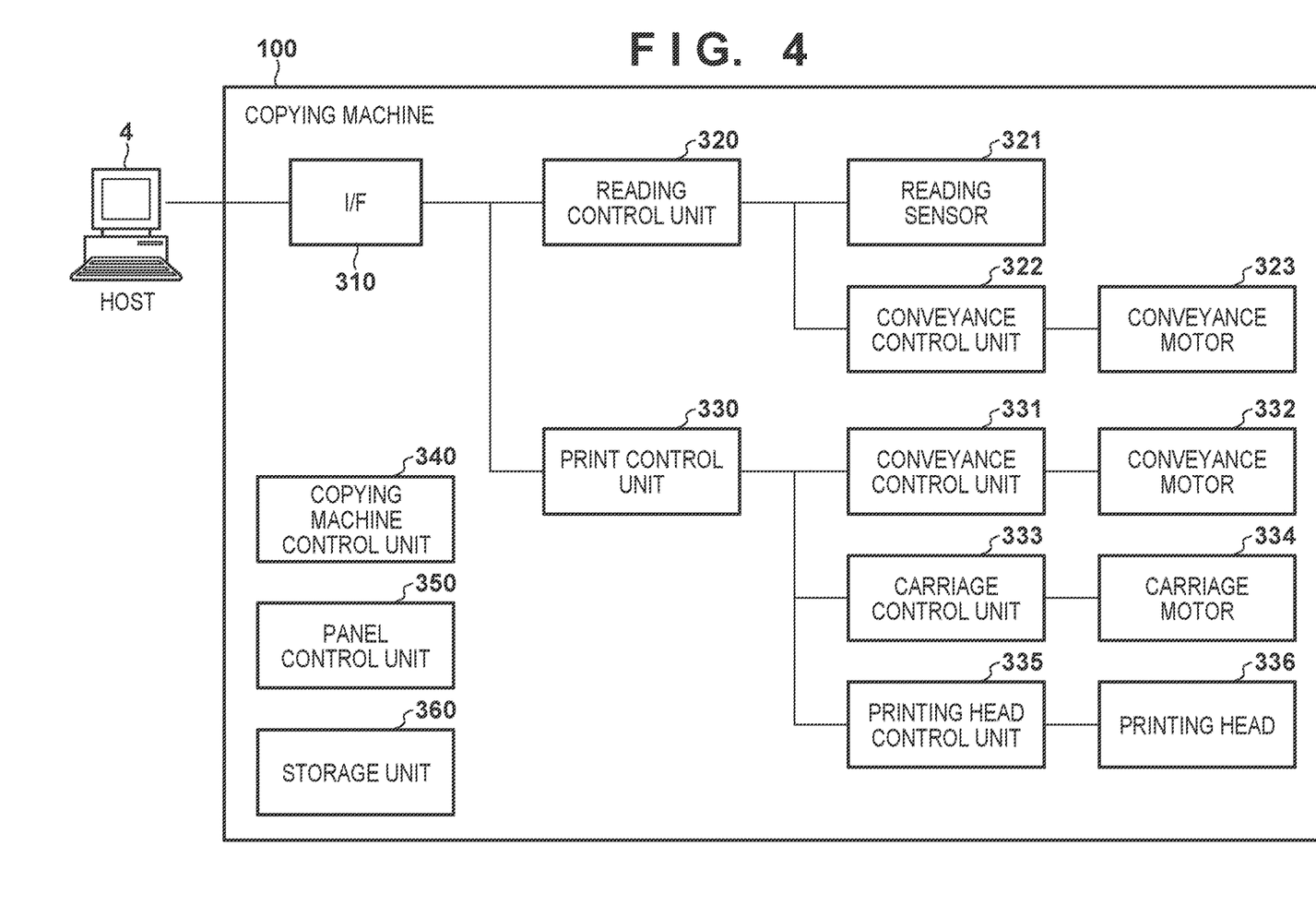
FIG. 4 is a block diagram illustrating a schematic configuration of a system of the copying machine.

FIG. 4 is a block diagram illustrating a schematic configuration of a system of the copying machine 100. For instance, when a copy function is performed by the copying machine 100, a host PC 4 is an external device of the present embodiment and transmits a job and data to the copying machine 100. A copying machine control unit 340 is configured as a controller including a processor, such as a CPU, and a memory, such as a ROM and a RAM, and integrally controls the entire process in the copying machine 100. The copying machine control unit 340 is connected to a panel control unit 350, a storage unit 360, an I/F 310, a reading control unit 320, and a printing control unit 330 via a bus. The operation of the copying machine 100 in the present embodiment is, for instance, achieved by reading the program stored in the ROM by the CPU into the RAM and executing it. In the present embodiment, the storage unit 360 includes an external storage device, such as a USB memory or a hard disk.

The interface (I/F) 310 is a configuration for connecting and communicating with a network, and receives, for instance, a job and data transmitted from the host PC 4. When the data transmitted from the host PC 4 is print data, the copying machine control unit 340 transmits a print instruction to the print control unit 330. The transmission process, the folder storage process, and the mail process are also performed using the I/F 310.

The print control unit 330 is configured as a controller including a processor, such as a CPU, and a memory, such as a ROM and a RAM, and integrally controls the printing device mechanism 1. The print control unit 330 spools the print data transmitted from the host PC 4 in a hard disk drive (HDD) in the storage unit 360, converts it into a data format that can be recorded by a printing head 336, and stores it in a print buffer in the storage unit 360. The print control unit 330 determines a printing method including, for instance, a print mode based on the print data transmitted from the host PC 4 and information (such as job information and meta information) accompanying the print data. For instance, the printing method may be set by an application program installed in the host PC 4 or may be set on a setting screen displayed on the panel 3. The print control unit 330 controls a conveyance control unit 331 and a carriage control unit 333 according to the determined printing method. The conveyance control unit 331 drives a conveyance motor 332 to move the printing medium in the sub-scanning direction by the paper feed rollers 104. The printing medium is, for instance, the roll paper 102 in FIG. 2. The carriage control unit 333 drives a carriage motor 334 to move the carriage 106 in the main scanning direction. A printing head control unit 335 reads print data from the storage unit 360 and transfers the print data to the printing head 336 in accordance with the operation of the carriage 106. Thus, recording is performed on a desired position on the printing medium.

The reading control unit 320 is configured as a controller including a processor, such as a CPU, and a memory, such as a ROM and a RAM, and integrally controls the reading device mechanism 2. When the media sensor 208 detects the document 203, the reading control unit 320 instructs the document set state to the conveyance control unit 331. Upon receiving the instruction of the document set state, a conveyance control unit 322 drives the conveyance motor 323 to convey the document 203 up to the position of the media sensor 209 by the conveyance rollers 204 to set the document set state. Upon receiving the reading start instruction from the user in the document set state, the panel control unit 350 transmits the reading start instruction to the copying machine control unit 340. The copying machine control unit 340 transmits the reading start instruction to the reading control unit 320, and the reading control unit 320 instructs the conveyance control unit 322 to start conveyance. A reading sensor 321 optically reads the surface of the document 203 passing through below the reading sensor 321, and the read data that has been read is stored in a reading buffer in the storage unit 360. The reading sensor 321 corresponds to the reading sensor 201 in FIG. 3. At this time, concurrently with the reading operation, the reading control unit 320 measures the conveying amount from the detection of the distal end of the document 203 until the detection of the rear end of the document 203 using the media sensor 209, and detects the sheet length of the document 203 based on the measurement result.

In response to acceptance of the execution instruction of the output process, the copying machine control unit 340 performs the output process according to the execution instruction. As described above, in the present embodiment, the copying machine control unit 340 can perform the copy process, the transmission process, the memory storage process, the folder storage process, and the mail process as the output process. Note that the copying machine control unit 340 may be configured to further perform another process. For instance, the printing process that performs printing based on image data received from, for instance, the host PC 4 or image data stored in an externally-attached memory may be performable. The execution instruction is, for instance, a user operation to the setting screen displayed on the panel 3. The example includes a job that is received from, for instance, the host PC 4 and is for the host PC 4 to instruct the copying machine 100 to perform the output process.

The block configuration of the copying machine 100 is not limited to the configuration illustrated in FIG. 4, and can appropriately include a configuration according to the function of the copying machine 100. For instance, the reading control unit 320 and the printing control unit 330 detect an error, such as a jam, based on a signal from a sensor provided on a conveyance path of the reading device mechanism 2 and the printing device mechanism 1. Further, it is possible to detect the remaining amount of a consumable item, such as ink, used for recording on the printing medium. Further, respective control units for controlling processes other than the reading process or the printing process may be provided in the copying machine 100. In the present embodiment, it is assumed that the copying machine control unit 340 operates as the control unit that controls the respective processes.

Figure 5:
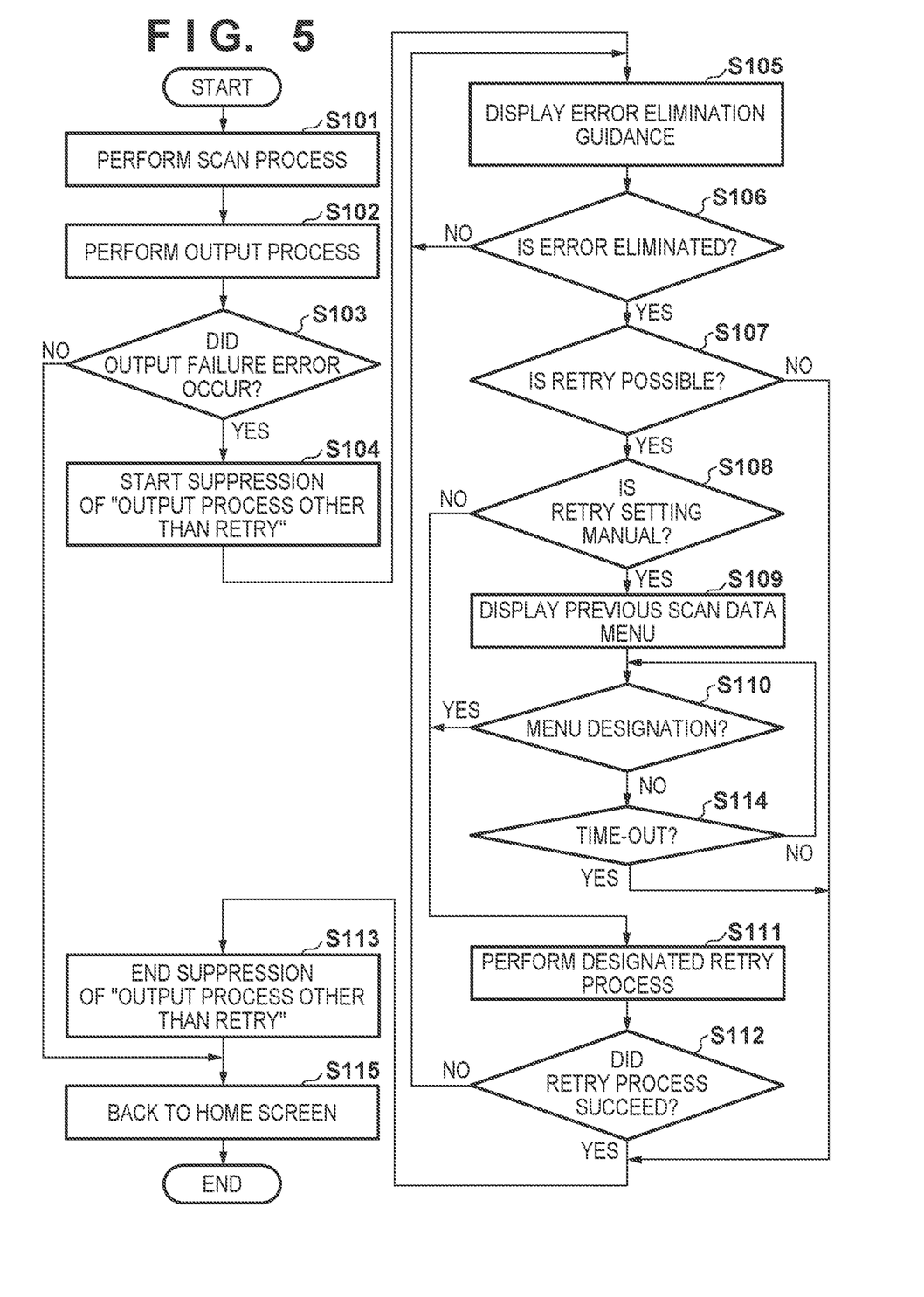
FIG. 5 is a flowchart depicting an output process of read data.

FIG. 5 is a flowchart depicting an output process of read data. The processes in FIG. 5 are, for instance, achieved by reading the program stored in the ROM by the CPU in the copying machine control unit 340 into the RAM and executing it. The process of FIG. 5 is started upon the copying machine 100 receiving the execution instruction of the output process. In the following description, as one example, it is assumed that the execution instruction of the copy process is received.

In S101, as described in FIG. 4, the copying machine control unit 340 performs the reading process of the document 203 and stores the read data in the reading buffer in the storage unit 360.

In S102, the copying machine control unit 340 performs the output process during the reading process or after completion of the reading process. Here, since the execution instruction of the copy process is received, the output process is the copy process (printing process of read data). The print control unit 330 performs the copy process based on the read data stored in the read buffer in the storage unit 360 in response to the instruction from the copying machine control unit 340.

In S103, the copying machine control unit 340 determines whether an error has occurred during performing the output process. When an error occurs, the output process is interrupted. For instance, when the output process is the copy process, it is determined whether a printing-related error, such as a paper jam error or an out of ink error, has occurred. Further, for instance, when the output process is the memory storage process, it is determined whether an error related to the memory storage process, such as an error in which the memory is removed from the copying machine 100 during storage, has occurred. In a case where the output process is the transmission process, the folder storage process, or the mail process, it is determined whether an error of disconnection with the network or an error due to incorrect designation of the storage destination or the transmission destination of the read data has occurred.

When the output process is completed without determination that an error has occurred in S103, the process proceeds to S115. In S115, the copying machine control unit 340 causes the panel 3 to display a home screen by the panel control unit 350, and then terminates the process of FIG. 5. On the other hand, when it is determined that an error has occurred in S103, the process proceeds to S104.

In S104, the copying machine control unit 340 starts a suppression process that suppresses the output process based on the execution instruction received from an external device. Here, the output process to be suppressed refers to an output process other than the output process in which it is determined that an error has occurred in S103 (in the above example, the copy process in which it is determined that an error has occurred). For instance, in the case of this example, the output process based on the job for the execution instruction other than the execution instruction that has triggered the process of FIG. 5 is determined to be an output process other than retry. Specifically, the suppression process performed here is, for instance, a process of discarding a job transmitted from the host PC 4 or a process of transmitting a notification to the host PC 4 such that a job is not transmitted from the host PC 4. The process in S104 is a process for blocking an interrupt of a job that performs the output process other than the output process determined to be an error, and thus it is possible to give priority to eliminating the error that currently occurs and complete the output process corresponding to the job. It should be noted that a configuration in which this suppression process is not performed (a configuration in which S104 is omitted and the process proceeds to S105) may be employed.

In S105, the copying machine control unit 340 causes the panel 3 to display a guidance (error elimination guidance) for eliminating the error determined to have occurred in S103 by the panel control unit 350. For instance, when it is determined that a jam error has occurred in the vicinity of a cover (not illustrated) of the copying machine 100, a guidance, such as "Open the cover and remove the document. Press the OK key after removal." is displayed on the panel 3.

In S106, the copying machine control unit 340 determines whether the error has been eliminated as a result of the display of the error elimination guidance. The processes in S105 and S106 are repeated until it is determined that the error is eliminated in S106. Note that this determination may be omitted, and the process may proceed to S107 regardless of whether the error has been eliminated. This is because, as will be described later, in the present embodiment, for instance, the output process other than the copy process can be selected as the output process to be performed after a printing-related error has occurred, and there is a use case in which there is no problem even when an error exists.

When it is determined that the error has been eliminated in S106, the copying machine control unit 340 determines whether retry of the output process interrupted by the error is possible in S107. For instance, the copying machine control unit 340 may determine that the retry is possible as long as the read data is stored in the read buffer in the storage unit 360. In the present embodiment, it is assumed that ON/OFF of a function "Hold the previous scan data" can be set on a setting screen. In a case where "Hold the previous scan data=OFF" is set, the read data stored in the read buffer is deleted when the output process is interrupted due to an error or when the output process is completed. On the other hand, when "Hold the previous scan data=ON" is set, the read data stored in the read buffer is not deleted but maintained even when the output process is interrupted due to an error or when the output process is completed. Therefore, for instance, in a case where the user has set "Hold the previous scan data=OFF" in advance, it is determined that the retry is impossible in S107. When the size of the read data is too large to store the read data (for instance, read data of a long document), even when the user has set "Hold the previous scan data=ON" in advance, since the read data is not stored in the reading buffer, it may be determined that the retry is impossible in S107. Further, when a free space in the storage unit 360 is a predetermined amount or less and therefore the read data is not stored in the read buffer, it may be determined that the retry is impossible in S107. As described above, various conditions can be employed as determination criteria in S107. When it is determined that the retry is impossible in S107, the process proceeds to S113.

In S113, the copying machine control unit 340 terminates the suppression process. The process in S113 allows performing another output process when another execution instruction is received. In S115, the copying machine control unit 340 causes the panel control unit 350 to display the home screen on the panel 3, and then terminates the process of FIG. 5.

On the other hand, when it is determined that the retry is possible in S107, the copying machine control unit 340 determines whether the retry setting is "manual" in S108. In the present embodiment, it is assumed that the retry setting performable on the setting screen includes the "manual" setting, which is setting in which retry of the output process after an error is performed after the user performs a manual operation on the copying machine 100 after the error. It is assumed that the retry setting includes "automatic" setting which is setting in which the retry of the output process after an error is automatically performed without the manual operation by the user on the copying machine 100 after the error. In the "automatic" setting, the content of the output process automatically performed after the error can be set. For instance, when the content of the output process automatically performed after the error is the copy process, "retry setting=automatic (copy process)" is set. Therefore, for instance, when "retry setting=automatic (copy process)" or "retry setting=automatic (folder storage process)" is set in the setting screen of the reading process displayed on the panel 3, the process proceeds from S108 to S111, and the copying machine control unit 340 performs the set retry process without designation from the user.

For instance, when "retry setting=automatic (copy process)" is set, the printing process is performed in S111 based on the read data stored in the read buffer in the storage unit 360. When "retry setting=automatic (folder storage process)" is set, the read data stored in the read buffer in the storage unit 360 is stored in a designated folder in S111. As a setting method in the case of "retry setting=automatic," orders of priority may be added to a plurality of re-output methods like "retry setting=automatic (priority order 1: printing, priority order 2: folder storage)." In this case, for instance, when the copying machine is in a printable state, the copying machine performs printing, and when printing is impossible due to, for instance, insufficient remaining amount of ink, the read data is stored in the designated folder as the output process with the second priority order.

When it is determined that the retry setting is "manual" in S108, the copying machine control unit 340 causes the panel control unit 350 to display a "Previous Scan Data Menu" screen in S109.

Figure 6A:
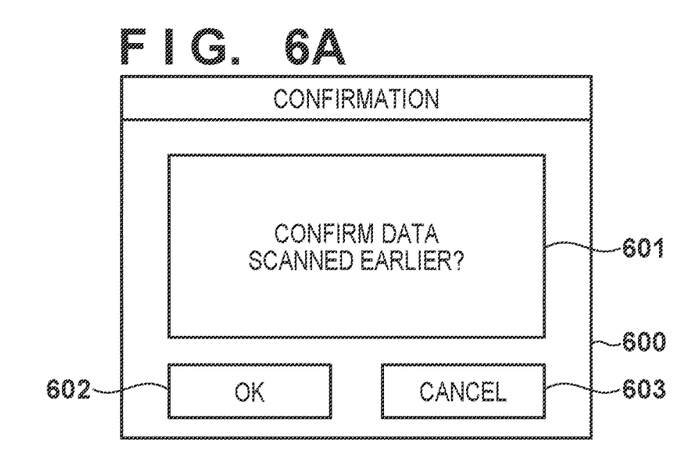
FIGS. 6A to 6D are diagrams illustrating a user interface screen.
Figure 6B:
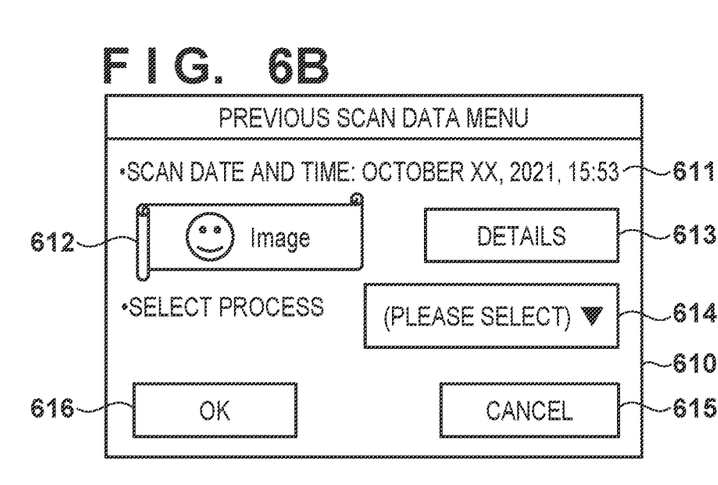

FIG. 6A is a diagram illustrating the "Previous Scan Data Menu" screen displayed in S109. A message asking for confirmation of the read data stored in the read buffer in the storage unit 360 in S101, such as "Confirm the data scanned earlier?" is displayed on a screen 601. When an OK button 602 is pressed, a screen 610 in FIG. 6B is displayed, and when a cancel button 603 is pressed, the display of the screen 601 is terminated and the process proceeds to S110. In this case, since the retry process is not performed, it is determined that the designation of the retry process is not received in S110, it is determined that the predetermined time has elapsed in S114, and the process proceeds to S113.

A display 612 on the screen 610 in FIG. 6B is a reduced preview image based on the read data. When a details button 613 is pressed, the panel control unit 350 displays a preview image obtained by enlarging the display 612. A display 611 displays data and time when the reading process was performed in S101. A button 614 is a button for displaying a pull-down menu that allows receiving selection of the retry process. In addition to the preview screen, an editing screen of the read data may be displayed. For instance, a screen on which editing, such as enlargement/reduction, rotation, and trimming of read data, can be performed may be displayed. The configuration allows performing the retry process after the read data is edited.

Figure 6C:
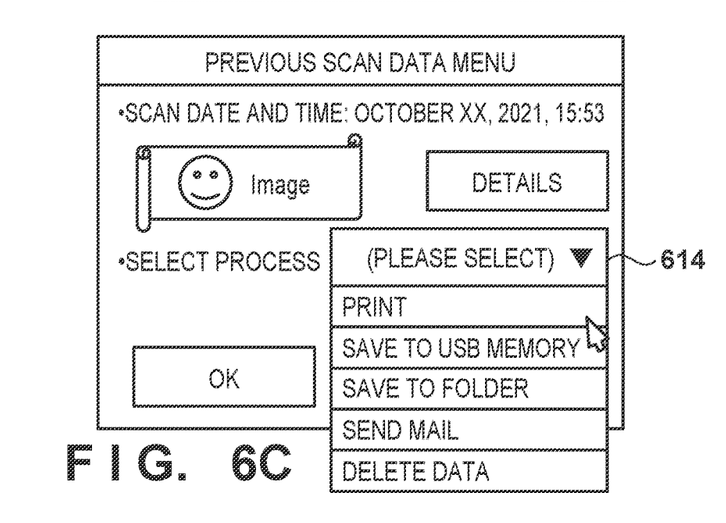

FIG. 6C illustrates the state in which the button 614 is pressed. As illustrated in FIG. 6C, when the button 614 is pressed, the pull-down menu for the retry process is displayed. FIG. 6C is a selection screen on which menus of "Print," "Save in USB Memory," "Save in Folder," "Send by Mail," and "Delete the Data" are selectably displayed as examples of candidates for the retry process. "Print" is an area for selecting the copy process as the output process to be performed. "Save in USB Memory" is an area for selecting the memory storage process as the output process to be performed. "Save in Folder" is an area for selecting the folder storage process as the output process to be performed. When "Save in Folder" is selected, a screen (not illustrated) for designating the storage destination of the read data is further displayed. As the storage destination of the read data, a folder in the copying machine 100 or a folder on the network can be designated. "Send by Mail" is an area for selecting the mail process as the output process to be performed. When "Send by Mail" is selected, a screen (not illustrated) for designating a mail transmission destination is further displayed. "Delete the Data" is a menu for deleting the read data. That is, when "Delete the Data" is selected, the output process is not performed and the read data is deleted. When a menu is selected in the FIG. 6C and the OK button 614 is pressed, the selected retry process is performed. Pressing a cancel button 615 causes the display to go back to a screen 600 in FIG. 6A. When "Delete the Data" is selected and the OK button 616 is pressed, the read data is deleted from the read buffer in the storage unit 360 together with data and time information. As the menu related to the management of the read data, there may be other items, such as settings of a storage period of the read data and validity/invalidity of storage of the read data after the retry process is performed.

Figure 6D:
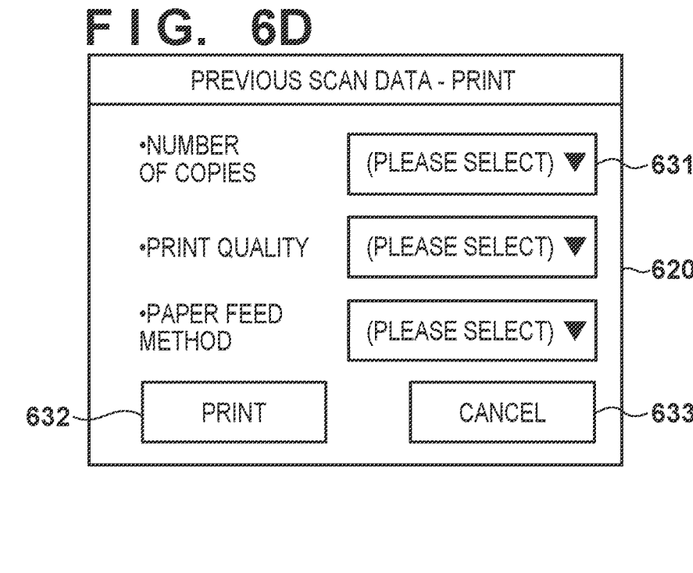

FIG. 6D illustrates a screen displayed when "Print" is selected and the OK button 614 is pressed in FIG. 6C. On a screen 620, setting items 631, such as the number of copies, print quality, and a paper feed method, are displayed as a pull-down menu. When a print button 632 is pressed after the setting in the setting item 631, it is determined that designation of the retry process is received in S110, and the printing process is performed in S111 according to the item selected in the setting item 631. Pressing a cancel button 633 causes the display to go back to the screen 610 in FIG. 6B. Note that there may be a configuration in which the retry setting is absent, the determination of S108 is omitted, and the process proceeds to S109. In other words, a configuration in which the retry setting may be only manually operated.

In S110, the copying machine control unit 340 determines whether the panel control unit 350 has received the selection (designation) of the output process from the user via the panel 3. When it is determined that the selection of the output process has been received, the copying machine control unit 340 performs the output process selected in S110 in S111. The output process performed at this time is performed based on the read data stored in the read buffer. That is, the output process is performed based on the read data obtained by the scan performed in S101 and used in the output process in which the error has occurred. As a result, in the present embodiment, the output process can be performed without performing scanning again after the error.

In S112, the copying machine control unit 340 determines whether the output process has succeeded. The output process here is the output process set to "automatic" on the setting screen for the reading process or the output process selected by the user in S110. When it is determined that the output process has succeeded in S112, the copying machine control unit 340 terminates the suppression process in S113. By the process of S113, the output process of another job can be performed. In S115, the copying machine control unit 340 causes the panel control unit 350 to display the home screen on the panel 3, and then terminates the process of FIG. 5. On the other hand, when the output process fails in S112, for instance, a jam error occurs, the process is repeated from S105.

When it is determined that the selection of the output process is not received in S110, the copying machine control unit 340 determines whether a predetermined time has elapsed (time-out) after the display of the "Previous Scan Data Menu" screen in S109 in S114. When it is determined that the predetermined time has elapsed, the process proceeds to S113, and when it is determined that the predetermined time has not elapsed, the process is repeated from S110.

When it is determined that the predetermined time has elapsed in S114, the output process after the error is not performed. In this case, the "Previous Scan Data Menu" screen may be able to be displayed from the home screen. With such a configuration, the user can perform the output process even when the predetermined time has elapsed for some reason. In this case, the copying machine control unit 340 starts the suppression process and then repeats the process from S111. The predetermined time used in S114 may be settable in advance by the user via the panel 3.

As described above, according to the present embodiment, even when an error occurs in the output process based on the read data, it is not necessary to repeat the process from the reading process. As a result, it is possible to further improve convenience related to retry of a large-sized document or a long document used in a large-format inkjet printing apparatus.

In the present embodiment, the printing process based on the read data has been described as an example of the output process, but the operation of the present embodiment can be applied to another output process based on the read data. For instance, the operation of the present embodiment can be applied to a case where a storage process in a USB memory, a storage process in a folder, or a mail transmission process is performed based on read data. For instance, when the USB memory is removed during storage of the read data in the USB memory, it is determined that an error has occurred in S103. In this case, when suppression of the "output process other than the retry process" is started in S104, the retry process is possible, and the setting of the retry process is "manual," the screens of FIGS. 6A to 6D are displayed in S109, and the selection of the retry process is received. With such a configuration, the user need not to repeat the process from the reading process. Also in the retry process, when printing fails, another type of output process, such as storing in a USB memory or on a network, can be performed. With such a configuration, for instance, resumption of printing by a printer other than the printer that failed in printing can be performed easily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disc (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-050454, filed Mar. 25, 2022, which is hereby incorporated by reference herein in its entirety.

What is claimed is:

1. An image processing apparatus comprising:
a first performing unit configured to perform a first output process using read data read by a reading unit configured to optically read a document image;
a display unit configured to display a selection screen, the selection screen including a preview image based on the read data read by the reading unit and an item for selecting a second output process different from the first output process, when an error occurs during performing the first output process;
a second performing unit configured to perform the second output process using the read data used in the first output process when the second output process is selected from the selection screen displayed in response to the occurrence of the error during performing the first output process,
wherein the first output process is any of a copy process that performs printing using the read data, a transmission process that transmits the read data to an external device, a memory storage process that stores the read data in an externally attached memory, a folder storage process that stores the read data in a predetermined folder on a network or a predetermined folder in the image processing apparatus, and a mail process that transmits the read data to a predetermined mail address, and
wherein the second output process is any of the copy process, the transmission process, the memory storage process, the folder storage process, and the mail process, and is different from the first output process.

2. The image processing apparatus according to claim 1, wherein
the selection screen is a screen on which any of a plurality of output processes including the first output process and the second output process is selectable, and
an output process selected from the plurality of output processes is performed using the read data used in the first output process.

3. The image processing apparatus according to claim 1, wherein
after an error occurs during performing the first output process by the first performing unit, the second output process is performed using the read data used in the first output process without reading the document image by the reading unit.

4. The image processing apparatus according to claim 1, wherein
when an error occurs during performing the first output process, a screen on which setting for the second output process is performable is displayed.

5. The image processing apparatus according to claim 1, further comprising
a setting unit configured to perform a first setting or a second setting based on a user operation, the first setting automatically retrying the first output process when an error occurs during performing the first output process, the second setting being for displaying the selection screen when an error occurs during performing the first output process.

6. The image processing apparatus according to claim 1, further comprising
a printing unit configured to perform printing.

7. The image processing apparatus according to claim 6, wherein
the printing unit is configured to perform the printing on a roll paper.

8. The image processing apparatus according to claim 1, wherein the selection screen further includes an item for enlarging the preview image.

9. The image processing apparatus according to claim 1, wherein the selection screen further includes information of date and time when reading was performed by the reading unit.

10. A control method of an image processing apparatus comprising:
performing a first output process using read data read by a reading unit configured to optically read a document image;
displaying a selection screen, the selection screen including a preview image based on the read data read by the reading unit and an item for selecting a second output process different from the first output process, when an error occurs during performing the first output process;
performing the second output process using the read data used in the first output process when the second output process is selected from the selection screen displayed in response to the occurrence of the error during performing the first output process,
wherein the first output process is any of a copy process that performs printing using the read data, a transmission process that transmits the read data to an external device, a memory storage process that stores the read data in an externally attached memory, a folder storage process that stores the read data in a predetermined folder on a network or a predetermined folder in the image processing apparatus, and a mail process that transmits the read data to a predetermined mail address, and
wherein the second output process is any of the copy process, the transmission process, the memory storage process, the folder storage process, and the mail process, and is different from the first output process.

11. A non-transitory computer-readable storage medium storing a program configured to cause a computer to function to:

perform a first output process using read data read by a reading unit configured to optically read a document image;

display a selection screen, the selection screen including a preview image based on the read data read by the reading unit and an item for selecting a second output process different from the first output process, when an error occurs during performing the first output process;

perform the second output process using the read data used in the first output process when the second output process is selected from the selection screen displayed in response to the occurrence of the error during performing the first output process, wherein the first output process is any of a copy process that performs printing using the read data, a transmission process that transmits the read data to an external device, a memory storage process that stores the read data in an externally attached memory, a folder storage process that stores the read data in a predetermined folder on a network or a predetermined folder in the image processing apparatus, and a mail process that transmits the read data to a predetermined mail address, and wherein the second output process is any of the copy process, the transmission process, the memory storage process, the folder storage process, and the mail process, and is different from the first output process.

* * * * *